United States Patent [19]

Ernstoff

[11] 4,100,579
[45] Jul. 11, 1978

[54] AC OPERATED FLAT PANEL LIQUID CRYSTAL DISPLAY

[75] Inventor: Michael N. Ernstoff, Los Angeles, Calif.

[73] Assignee: Hughes Aircraft Company, Culver City, Calif.

[21] Appl. No.: 745,722

[22] Filed: Nov. 29, 1976

Related U.S. Application Data

[63] Continuation of Ser. No. 509,376, Sep. 24, 1974, abandoned.

[51] Int. Cl.² .......................... H04N 5/66; G02F 1/18; G02F 9/32; G02F 1/16
[52] U.S. Cl. ............................... 358/230; 340/324 M; 350/333
[58] Field of Search .................. 358/59, 56, 241, 230, 358/236; 340/324 M; 350/160 LC

[56] References Cited
PUBLICATIONS

Lechner et al., "Liquid Crystal Displays", *Proceedings of the IEEE*, vol. 59, No. 11, Nov., 1971, pp. 1566–1579.

*Primary Examiner*—John C. Martin
*Attorney, Agent, or Firm*—Martin E. Gerry; W. H. MacAllister

[57] ABSTRACT

A flat panel liquid crystal display system formed by sandwiching a thin layer of liquid crystal material between a front electrode structure, split into rows or columns, and a back electrode structure formed into desired patterns and including addressing circuitry is described. Single polarity operation of a liquid crystal display system in which the direction of current flow in the liquid crystal material is reversed at the frame rate is a feature of the invention. Operation is accomplished so as to permit gray scale rendition as response to an applied video signal. Addressing circuitry demonstrating the applicability of large scale integration (LSI) techniques is also an important element of the invention.

6 Claims, 10 Drawing Figures

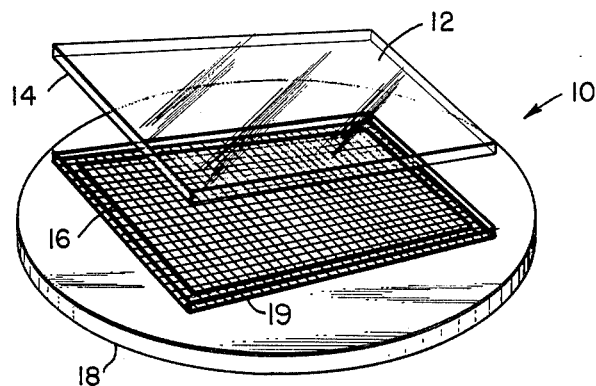
Fig. 1.
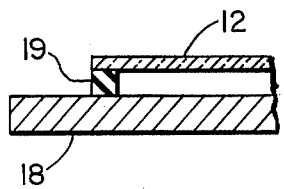
Fig. 1a
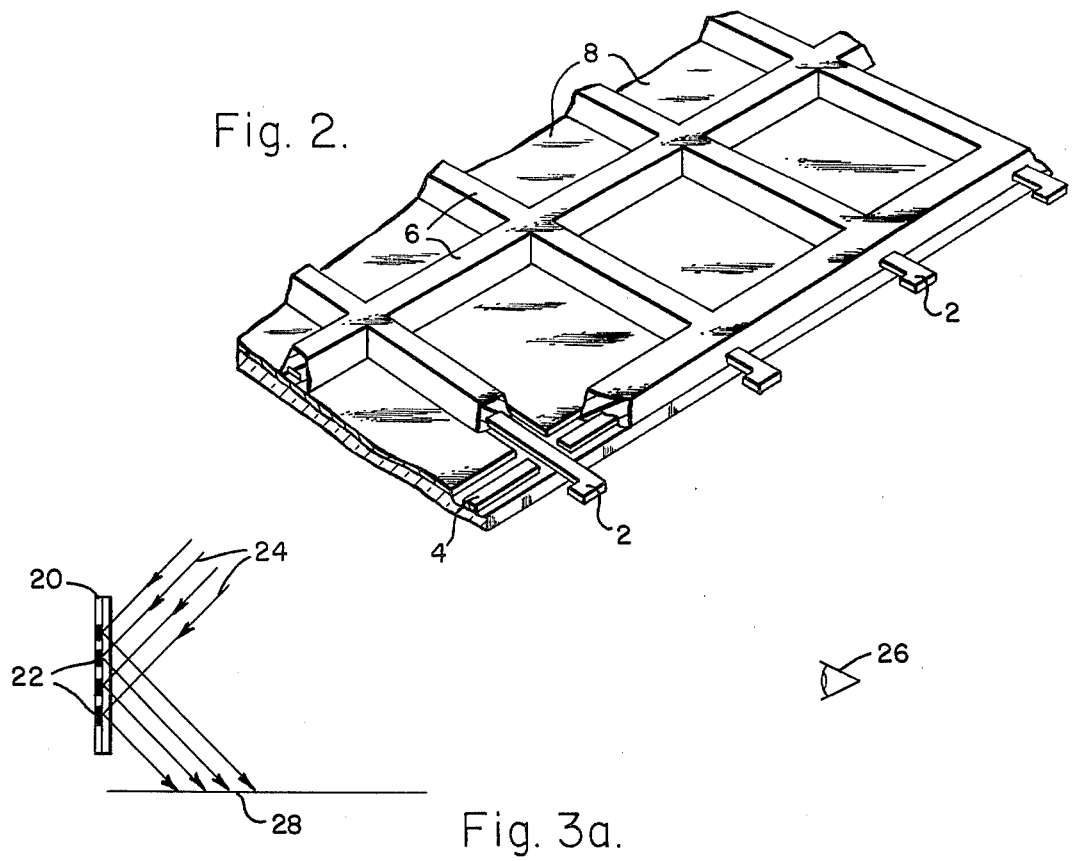
Fig. 2.
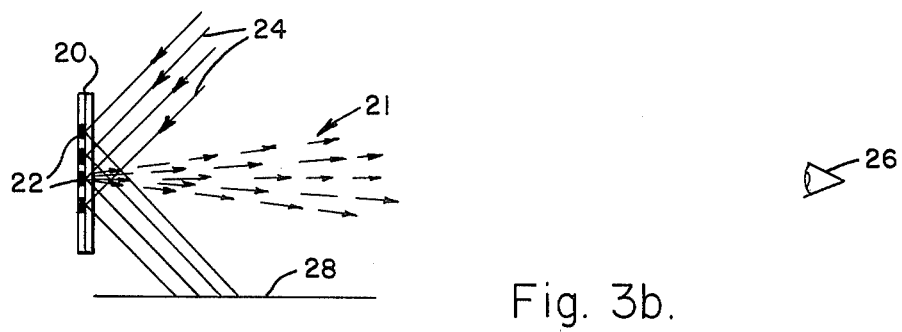
Fig. 3a.
Fig. 3b.

AC OPERATED FLAT PANEL LIQUID CRYSTAL DISPLAY

This is a continuation of application Ser. No. 509,376 filed Sept. 24, 1974, now abandoned.

CROSS-REFERENCE TO RELATED APPLICATIONS

Ser. No. 352,397, filed Apr. 18, 1973 describes a fabrication scheme using the methodology of large scale integration techniques whereby a matrix array of reflective electrodes, as well as the individual addressing circuitry and electrical storage circuitry for each liquid crystal cell of a flat panel liquid crystal display are formed on semiconductor back plates such that each reflective electrode forms one element or plate of the storage capacitor for the corresponding liquid crystal cell.

BACKGROUND OF THE INVENTION

1. Field of the Invention

This invention relates to liquid crystal display systems and particularly to such systems as are operated so as to periodically reverse the direction of current flow into a liquid crystal cell thus prolonging cell operating life many times over.

2. Description of the Prior Art

Liquid crystal substances have been a scientific curiosity since their peculiar properties first began to be recognized. These substances flow, pour and assume the shape of their containers as if they were liquids. However, the molecules comprising these substances, unlike the molecules of liquids, tend to form loosely ordered arrays rather like the regular lattices of crystals. When these substances are excited by electric fields, turbulent activity may be set up within the substance. This turbulence may cause the material which was originally transparent, to become white because the turbulent fluid scatters light. This effect has been called dynamic scattering. The scattering effect can be halted and the clarity of the material restored simply by turning off the electric field.

Liquid crystal substances are currently being used to create new families of devices for display. A liquid crystal display device differs fundamentally from an electronic display device such as a cathode ray tube which generates its own light. A liquid crystal device generates no light of its own, it scatters ambient light much as does this printed page. It has been noted that the liquid crystal is normally clear, but when an electric field is applied some regions in it become turbulent and scatter light. Images can thus be formed by controlling the shape and size of the turbulent regions caused by an incident electric field.

Since these liquid crystal devices reflect light instead of generating it, displays thus created can be viewed under a very wide range of lighting conditions including those which would wash out the image created on a light generating devices. Liquid crystal displays can thus be viewed in direct sunlight or in an ambient light field created, for example, by a flood light. Since liquid crystal devices do not emit light, they should require relatively little power and such is determined to be the case.

Liquid crystal display systems have been fabricated by sandwiching a thin layer of liquid crystal material between a glass plate which has been coated on one side with a conductive material forming a transparent electrode and a back plate having a matrix array of reflective electrodes formed on a semiconductor wafer.

Prior art devices have utilized a direct current in the application of the electric field. However, it has been shown that the operating life of liquid crystal materials can be increased many times by employing alternating current excitation rather than direct current excitation.

It would be of great benefit to the art to provide a display device which would dissipate much less power than the cathode ray tube and be usable in the same applications as the cathode ray tube. It would also be of great benefit to provide a display on which contrast could be maintained and even enhanced at high levels of ambient illumination. It would be of further greater value to provide a display exhibiting all the above advantages and in addition having a resolution uniform over the entire display area and whose resolution will be dramatically higher than that of a cathode ray tube.

SUMMARY OF THE INVENTION

An AC operated flat panel liquid crystal display device according to the invention is fabricated by sandwiching a thin layer of liquid crystal material between a front transparent plate having a transparent electrode split into rows or columns depending upon how the image is to be written, and a back plate having a matrix array of reflective electrodes. In the prior art, a single conductive sheet was used for the rear surface of the front transparent plate. When the flat panel liquid crystal display is DC operated, the front electrode is simply a uni-potential transparent electrode. An electrode structure of this type is unsuitable for AC operation as will be described in greater detail in this patent application.

It is thus an object of the present invention to provide a flat panel liquid crystal display representing a potential replacement for the cathode ray tube.

It is a further object of this invention to provide a display on which contrast can be maintained at high levels of ambient illumination.

It is a still further object of the present invention to provide a display whose resolution is uniform over the entire display area and whose resolution will be dramatically higher than that of a cathode ray tube.

An additional object of the present invention is to provide for a prolonged operating life for liquid crystal display devices.

Additional objects, advantages and characteristic features of the present invention will become readily apparent from the following detailed description of preferred embodiments of the invention when considered in conjunction with the accompanying drawings.

BRIEF DESCRIPTION OF THE DRAWINGS

FIG. 1 is an idealized drawing showing construction of a liquid crystal display device in accordance with the invention.

FIG. 1a is an enlarged side view of a portion of FIG. 1 showing a seal whereby the liquid crystal material may be retained.

FIG. 2 is an enlargement of a portion of FIG. 1.

FIGS. 3A and 3B are idealized explanatory drawings illustrating the operating principle of liquid crystal displays.

DESCRIPTION OF THE PREFERRED EMBODIMENT

Figure 4:
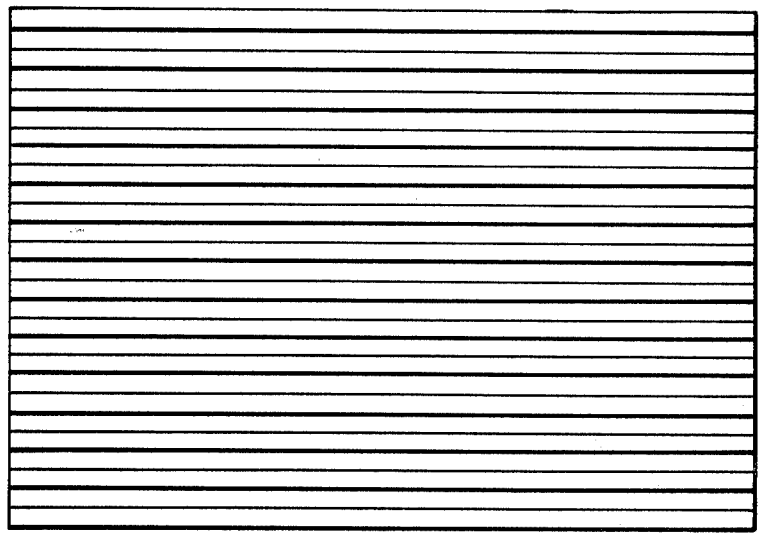
FIG. 4 illustrates the configuration of the front plate electrode of the invention.

Referring now to FIG. 1 with greater particularity the modular construction of a flat panel liquid crystal display device is illustrated. The device of the invention, noted generally as 10, comprises a front transparent cover plate 12 having transparent electrode strips on its rear surface at 14. A matrix array of reflective electrode 16 is formed on a semiconductor wafer 18. The flat panel liquid crystal display device is formed by sandwiching a thin layer of liquid crystal material between the transparent cover plate 12 and the semiconductor wafer 18. The liquid crystal material is retained between the cover plate 12 and the wafer 18 by a seal 19 which may be placed around the electrode 16 as illustrated by the enlarged side view shown in FIG. 1a. Details of the construction of the liquid crystal device are shown in the enlarged drawing of FIG. 2 where typical electrode 8 is formed by insulating barriers 6 housing typical row electrode bus 4 and typical column electrode bus and contact pad 2. The liquid crystal material is normally transparent, but it can be made to scatter incident light with the application of an electric field. By using a matrix of electrodes to set up an electric field with a desired pattern, an image can be formed. In the invention the electrodes are controlled by multiple layer electronic circuits formed in the semiconductor wafer using large scale integration (LSI) techniques.

The display may be viewed as shown in FIGS. 3A and 3B. In FIG. 3A the cell denoted as 20 is in the OFF condition. The liquid crystal material is clear and no light reaches the observer 26. An illuminating source 24 causes light to be incident upon the surface under the condition that the electrodes 22 have no current flowing in them. Since no light is scattered from the reflective electrodes under these conditions all the light is incident into light trap 28. None of the incident illumination reaches the viewer. In FIG. 3B a potential is applied to center electrode in device 20 thus a cone of light 21 is scattered from the area of said center electrode toward viewer 26. Since the cell is in the ON condition, that is with the potential applied thereto, a light scattering turbulence is created in the liquid crystal material. Light is thus forward scattered to observer 26. Referring now to FIG. 4 construction of the front plate electrodes as strips is shown.

Figure 5:
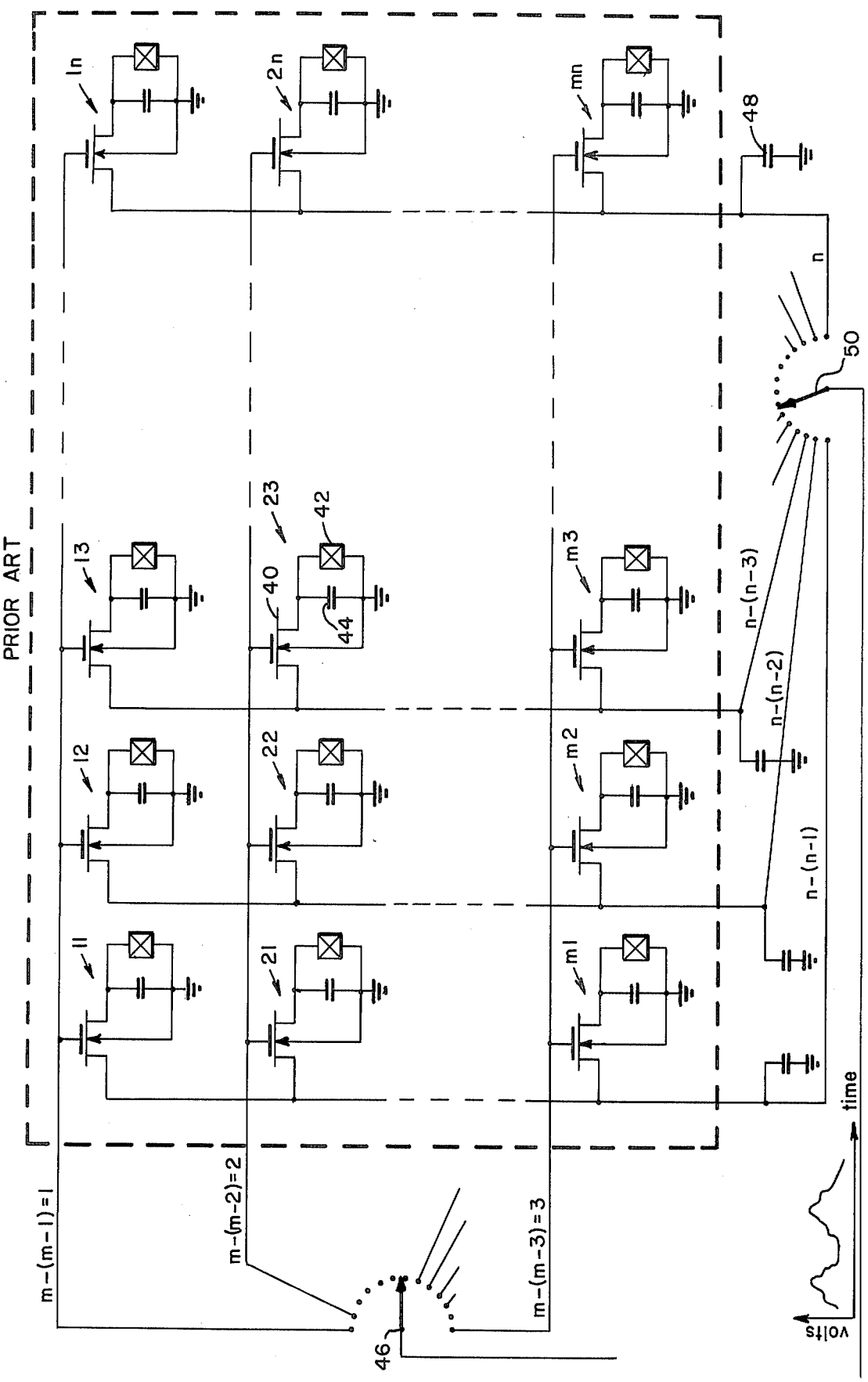
FIG. 5 is a schematic diagram illustrating a line-at-a-time addressing scheme such as might be used with the invention.

Referring now to FIG. 5 the schematic diagram of a possible line-at-a-time addressing circuit that may be used with the present invention is shown. A typical elemental field effect transistor is denoted at 40 with a typical elemental liquid crystal cell denoted at 42 and a typical elemental video storage capacitor noted at 44. These typical elements comprise an M by N matrix with each element containing the aforementioned three basic elements. By an M by N matrix is meant a matrix with M rows and N columns. With vertical sweep multiplexer 46 in position 1 video sampling multiplexer 50 is enabled to apply a video signal to row 1. It will be noted that with vertical sweep multiplexer in position 1 the gates of all field effect transistors in row 1 are energized. Video sampling multiplexer 50 may now apply the video signal to matrix element 11. When video sampling multiplexer 50 moves to its second position it may now apply the video signal to matrix element 12 and so on until video sampling multiplexer applies the video signal to matrix element 1N. Vertical sweep multiplexer 46 now moves to its second position thus energizing the gates of the field effect transistors in the second row. Video sampling multiplexer 50 may now write video intelligence into the second matrix row, that is matrix elements 21 through 2N. The process thus described continues until video information has been written into all the matrix elements, that is through matrix elements M1 through MN.

Figure 6:
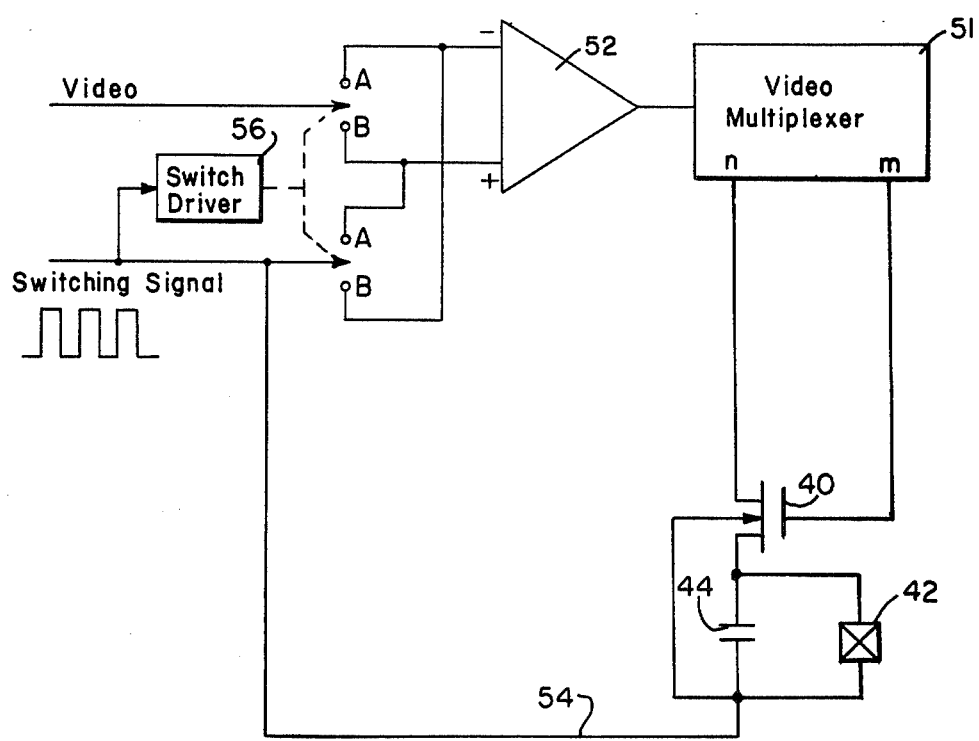
FIG. 6 is a block diagram illustrating a method of reversing the direction of current flow in the liquid crystal cells in accordance with the invention.
Figure 7:
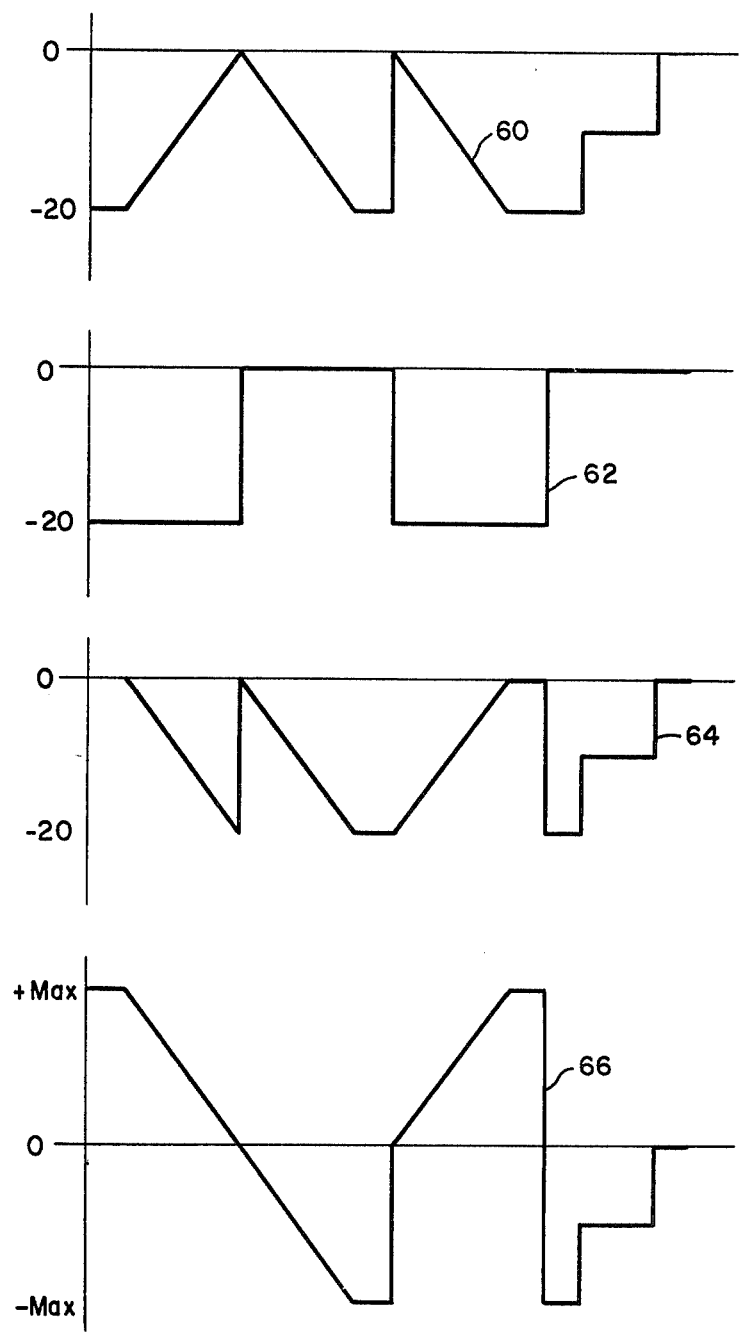
FIG. 7 is a waveform diagram further explaining how current flow is reversed in the liquid crystal cells each frame.

Referring now to FIG. 6, the convention may be taken for the sake of explanation, that the front elements will receive the switching signal indicated as a square wave from −20 to 0 volts, while the back elements receive the video information that also has a magnitude range from 0 to −20 volts. When the front element is at a −20 volt potential the video is supplied to the video multiplexer as an inverted signal. When the front elements are at 0 volts the video is supplied to the video multiplexer uninverted. It will be noted that operational amplifier 52 is a unity-gain amplifier and thus only serves a function of inversion. By operation of electronic switch 56 video information is supplied to either the negative or positive terminal of operational amplifier 52 whose output is either inverted or uninverted according to the position of electronic switch 56 and the magnitude of the switching signal. Video multiplexer 51, which includes the multiplexers 50 and 46 shown in FIG. 5, receives the output from operational amplifier 52 and applies it to liquid crystal cell 42. The switching signal is applied to conductive strips on front transparent cover plate 12 of FIG. 1 by means of a lead 54. Referring now to FIG. 7 the processing of a video signal may be explained in greater detail. Curve 60 represents the video input from a signal source. Curve 62 represents a switching signal as applied to the front electrode strips. Curve 64 represents the video output signal as applied to the drain electrode buses showing how it is inverted at every odd frame. Curve 66 denotes the current excursions showing the reversal of the direction of current flow with each frame. It is to be noted from FIG. 6 that the switching signal is applied both to the front electrodes of the liquid crystal cells and to the video input signals. Negative potentials from 0 to −20 volts are used for the video and the electrodes formed on the front panel of the liquid crystal cell are also driven between 0 and −20 volts. It is important to note the periodic reversal of the potential on the front panel strips, that is, the potential alternates between 0 and −20 volts with each successive frame. When the front plate strip is at 0 volts, the black level of video is also 0 and the white level is at −20 volts and the direction of conventional current flow is front electrode to rear electrode. When the front electrode plate is at −20 volts the black level of video is also −20 volts, the white level of video is at 0 volts, and the direction of conventional current flow is from back electrode to front electrode. Basically then the phase of the video signal is reversed each time the potential on the front electrode is switched from 0 to the potential corresponding to the maximum negative signal. As an example for a display of black with no-inverted video, the front electrode is at 0 volts and the back electrode is at 0 volts, therefore no current flows. If there were inverted video, the front electrode would be at −20 volts, the back electrode at −20 volts and again no current would flow. For a diaplay of white in the non-inverted video case the front electrode is at 0 volts and the back electrode is at −20 volts, therefore maximum current will flow from front to back. If the video were inverted, the front electrode would be at −20 volts and the back electrode would be at 0 volts thus maximum current would flow from back to front. For a display of intermediate gray with non-inverted video the front electrode at 0 volts the back electrode would be at a negative $V_x$ volts where $V_x$ is between 0 and the maximum negative signal. Current then would flow from front to back at a level proportional to $V_x$ volts. If the video were inverted, then the front electrode would be at −20 volts, the back electrode would be at [(maximum negative signal) −$V_x$] volts. Current would then flow from back to front at a level proportional to $V_x$ volts. Generalizing, the inverted and non-inverted video signal applied to the back electrode may be derived from an applied video signal, Video$_{(i)}$, according to the relation:

$$-V_{(i)} = [Video_{(i)}(-1)^m] + V_{max}[\tfrac{1}{2} - \tfrac{1}{2}(-1)^m]$$

where $m$ is the frame number and $V_{max}$ is the constant value of the potential applied to each of the electrically independent transparent conductive stripes which comprise the front electrode structure.

Referring now to FIG. 6 and FIG. 7 together, video signal processing in accordance with the invention for the example of a single cell may be described in greater detail. During frame one switch 46 FIG. 6 will be in position B. The front electrode of representative cell 42 will be at −20 volts and therefore video input signal 60 will be inverted. During the first quarter of frame number one the front electrode voltage minus the video input voltage is [(−20) − (−20)] = [(−20) +20 = 0 signal volts applied to the drain electrode buses of the FET (See FIG. 5) and thence to the representative liquid crystal cell 42. Maximum current flows from the back electrode to the front electrode of representative cell 42 because of the maximum applied potential difference, that is 0 at the back electrode and −20 at the front electrode.

During the second quarter of the first frame, video signal voltage rises to about −10.5 volts and front electrode voltage minus video input signal voltage is [(−20) − (−10.5)] = [(−20) +10.5] = −9.5 volts applied to the drain lines of the FET and thence to the representative liquid crystal cell 42.

During the third quarter of the first frame, video signal voltage rises to about −5.5 volts and front electrode voltage minus video signal input voltage is [(−20) − (−5.5)] = [−20 +5.5] = −14.5 volts applied to the drain lines of the FET and thence to the representative liquid crystal cell 42. The current flow during frame one is indicated in curve 62 showing the current decreasing from a maximum to 0. During frame two switch 46 in FIG. 6 will be in position A. The front electrode of representative cell 42 will be at 0 volts and therefore video signal 60 will be noninverted. The video output voltage shown in curve 64 will be a replica of the video input voltage shown in curve 60 since it is not being inverted. Tthe current flow during frame number 2 is shown in curve 66 as a decreasing current from 0 to a negative maximum. During frame three the same conditions will obtain as for frame number one, that is switch 46 in FIG. 6 will be in position B. The front electrode of representative cell 42 will be at a −20 volts and therefore video signal 60 will be inverted.

Examination of curve 66 will indicate that during the first frame current will flow from the front electrodes to the back electrodes. During the second frame current flows from the back electrodes to the front electrodes. In general then, during all odd numbered frames current will flow from the front electrodes to the back electrodes of all representative cells such as 42. While during all even numbered frames, current will flow from the back electrodes to the front electrodes. Thus there has been accomplished a reversal of current flow in representative cells such as 42 without necessitating a change in polarity of applied voltage.

When the flat panel liquid crystal display is DC operated, the front electrode may be simply a unipotential transparent electrode and indeed in the prior art a single conductive sheet was used for the rear surface of the front transparent plate. However an electrode structure of this type is unsuitable for AC operation as described in the invention. It is now known that for uniformity over the surface of the display that the front electrode must be split into rows or columns depending upon how the image is written.

The front electrode should be formed as a set of row electrodes if the display is row-at-a-time addressed or element-at-a-time addressed with the direction of fast sweep in the horizontal direction. In the preferred embodiment as described herein it will be assumed that the number of rows into which the front electrode is split is equal to the number of rows in the display. In the prior discussion it was pointed out that the front electrode must be switched between 0 and −20 volts at the frame rate implying that this transition takes place during the retrace interval. With a single conductive sheet used for the rear surface of the front transparent plate, the display operated in this manner will introduce a non-uniformity because of the time interval between when each element is written and when the potential of the front electrode changes is not a constant. If it is assumed for example that the display is written a row at a time from top to bottom then the time from when the top row is written until when front electrode switches is almost the period of a full frame and the time from when the bottom row is written until when the front electrode switches is a very small fraction of a full frame. This problem is solved by the present invention by splitting the front electrode into rows and switching the potential of each row immediately prior, during or immediately after addressing the corresponding row on the rear electrode. Thus no matter where an element is located on the display, whether it be at the top or at the bottom, the time from when it is written into until the time when the front electrode switches is constant.

Figure 8:
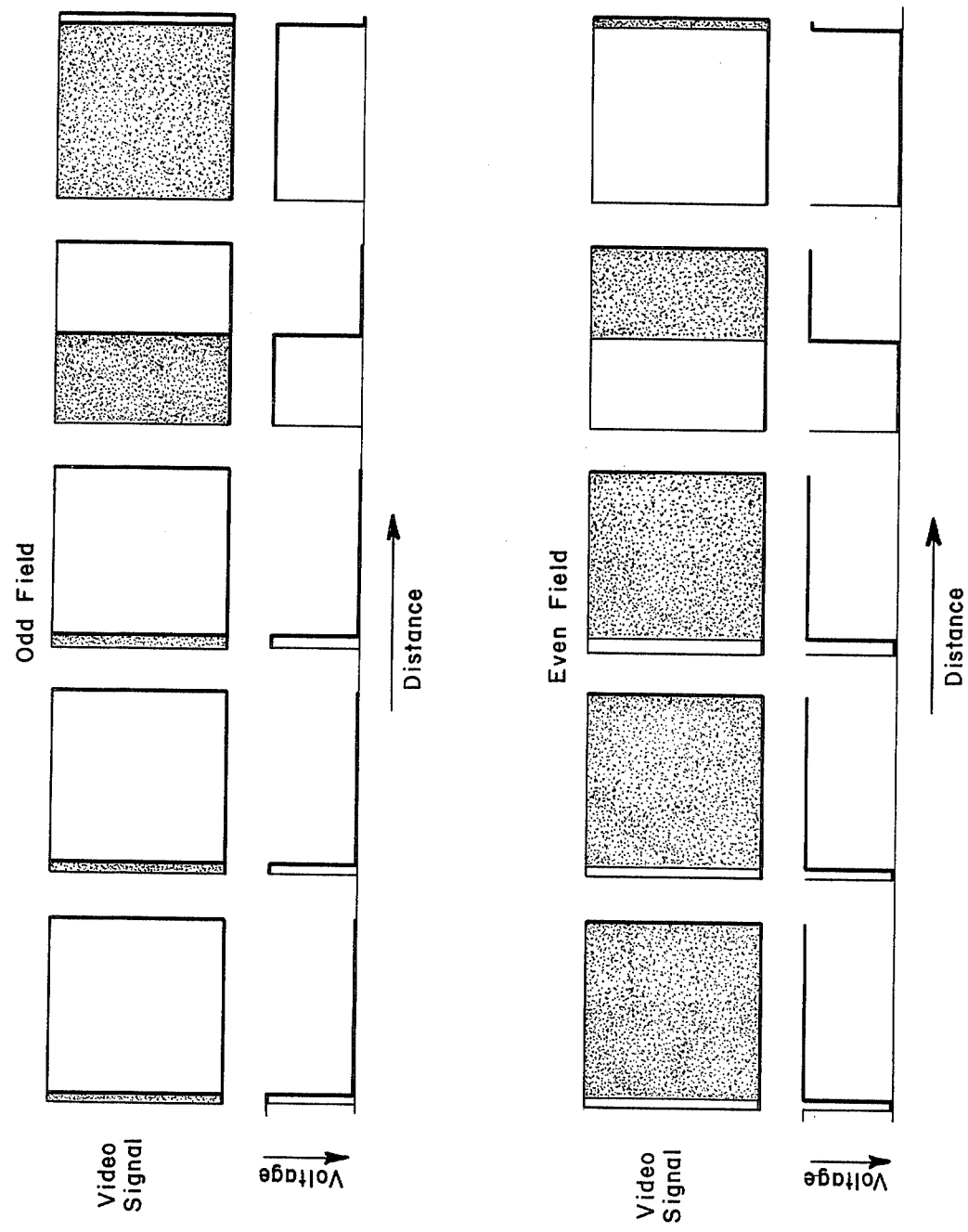
FIG. 8 is a time signal-sweep diagram further explaining the operation of the invention.

The front electrode should be formed as a set of column electrodes if the display is column-at-a-time addressed or element-at-a-time addressed with the direction of fast sweep in the vertical direction. The front electrode strips need not be precisely aligned over the columns or rows of the display. A position tolerance of approximately 5% of the display width has been found to be quite tolerable. The field between front electrode strips will not generate a significant number of scattering centers because of the short time duration of the field; that is, the strips are switched at approximately 100 to 1,000 strips per frame, the number of strips being dependent upon the number of lines in the display. Referring now to FIG. 8, there is illustrated a column addressed liquid crystal display device. This Figure again shows that for an odd field the direction of conventional current flow is from the front electrode to the rear electrode and that half of the display is driven with normal video while the other half is driven with an inverted video signal. It is further shown that the direction of conventional current flow for even fields is from the rear electrode to the front electrode and that one portion of the display is driven with normal video while another portion is driven with inverted video.

There has thus been shown a simple means for AC operation of a liquid crystal cell. It is known that by periodically reversing the direction of current flow in a liquid crystal cell the lifetime of the cell can be increased by at least one or two orders of magnitude over DC operation. Such a liquid crystal display devide represents a potential replacement for the cathode ray tube and further provides a display on which contrast can be maintained at high levels of ambient illumination. Such a device promises to provide a display whose resolution is uniform over the entire display area and whose resolution will be dramatically higher than that of a cathode ray tube. The method of operating the device provides for reversal of the direction of current flow into liquid crystal material at the frame rate, it permits single polarity operation and it permits gray scale rendition.

Although the invention has been shown and described with reference to a particular embodiment, nevertheless, various changes and modifications obvious to a person skilled in the art to which the invention pertains are deemed to lie with the purview of the invention.

What is claimed is:

1. A liquid crystal display system responsive to a video display signal having a frame rate comprising:
a transparent coverplate having a first electrode structure comprising a multiplicity of electrically independent transparent conductive stripes formed as elements on one of its surfaces;
a second electrode structure formed on a semiconductor wafer having a plurality of elements;
a layer of liquid crystal material sandwiched between said first electrode structure and said second electrode structure;
an insulating spacer providing electrical insulation and physical spacing between said first electrode structure and said second electrode structure;
sealing means for providing retention of said liquid crystal material between said transparent cover plate and said semiconductor wafer;
means for inversion of an applied video signal at a periodic rate equal to the frame rate of a video display signal, thus providing an inverted and a non-inverted video signal at alternate frames;
means for maintaining the polarity of the inverted video signal the same as the polarity of the non-inverted video signal;
means for the sequential application and removal of a constant value of potential to each of said multiplicity of electrically independent transparent conductive stripes at a periodic rate equal to the frame rate of said video display signal; and addressing means for applying said inverted and said non-inverted video signals, alternately received from the means for inversion, to said second electrode structure whereby the direction of current flow between elements of said first electrode structure and said second electrode structure is reversed at a periodic rate equal to the frame rate of the video display signal.

2. A liquid crystal display system according to claim 1 in which the elements of said second electrode structure comprises a matrix array of reflective electrodes.

3. A liquid crystal display system according to claim 1 in which said insulating spacer defines a plurality of elemental liquid crystal cells and said addressing means comprises a conventional metal oxide semiconductor field-effect transistor and a video storage capacitor.

4. A liquid crystal display system according to claim 1 in which said second electrode structure connects to a common bus.

5. A method of increasing the life of a liquid crystal material located between first and second structures in a liquid crystal display system for displaying successive frames of video signal information, comprising the steps of:
maintaining polarity of the video signals applied to one of said electrode structures the same during successive frames and;
reversing the direction of the current flow between the first and second electrode structures at the end of each frame.

6. A liquid crystal display system responsive to a video display signal having a frame rate comprising:
a transparent coverplate having a first electrode structure comprising a multiplicity of electrically independent transparent conductive stripes formed on one of its surfaces;
a second electrode structure formed on a semiconductor wafer;
a layer of liquid crystal material sandwiched between said first electrode structure and said second electrode structure;
an insulating spacer providing electrical insulation and physical spacing between said first electrode structure and said second electrode structure;
a seal providing retention of said liquid crystal material between said transparent cover plate and said semiconductor wafer;
means for inversion of an applied video signal at a periodic rate equal to the frame rate of a video display signal, thus providing an inverted and a non-inverted video signal at alternate frames wherein said inverted and said non-inverted video signals $V_{(i)}$ are derived from said video display signal, $Video_{(i)}$, according to the relation:

$$-V_{(i)} = [Video_{(i)}(-1)^m] + V_{max}[\tfrac{1}{2} - \tfrac{1}{2}(-1)^m]$$

where $m$ equals the number of the frame and $V_{max}$ is said constant value of potential applied to each of said multiplicity of electrically independent transparent conductive stripes;
means for maintaining the polarity of the inverted video signal the same as the polarity of the non-inverted video signal;
means for the sequential application and removal of a constant value of potential to each of said multiplicity of electrically independent transparent conductive stripes at a periodic rate equal to the frame rate of a video display signal; and addressing means for applying said inverted and said non-inverted video signals, alternately received from the means for inversion, to said second electrode structure whereby the direction of current flow between elements of said first electrode structure and said second electrode structure is reversed at a periodic rate equal to the frame rate of the video display signal.

* * * * *